(12) United States Patent
Uehara

(10) Patent No.: US 11,841,061 B2
(45) Date of Patent: *Dec. 12, 2023

(54) DAMPER DEVICE

(71) Applicant: EXEDY Corporation, Neyagawa (JP)

(72) Inventor: Hiroshi Uehara, Neyagawa (JP)

(73) Assignee: EXEDY Corporation

( * ) Notice: Subject to any disclaimer, the term of this patent is extended or adjusted under 35 U.S.C. 154(b) by 327 days.

This patent is subject to a terminal disclaimer.

(21) Appl. No.: 17/369,150

(22) Filed: Jul. 7, 2021

(65) Prior Publication Data

US 2022/0042572 A1 Feb. 10, 2022

(30) Foreign Application Priority Data

Aug. 7, 2020 (JP) ................................. 2020-134863

(51) Int. Cl.
*F16F 15/123* (2006.01)

(52) U.S. Cl.
CPC .............................. *F16F 15/12373* (2013.01)

(58) Field of Classification Search
CPC ............... F16F 15/123; F16F 15/12306; F16F 15/12353; F16F 15/1236; F16F 15/12366; F16F 15/12373; F16F 15/134; F16F 15/13407; F16F 15/13469; F16F 15/13476; F16F 15/13484; F16F 15/13492; F16F 2228/066
See application file for complete search history.

(56) References Cited

U.S. PATENT DOCUMENTS

| | | | | |
|---|---|---|---|---|
| 6,461,243 B1 * | 10/2002 | Uehara | ............. | F16F 15/12326 464/68.92 |
| 7,192,354 B2 * | 3/2007 | Uehara | ............... | F16F 15/1292 464/68.4 |
| 7,942,749 B2 * | 5/2011 | Uehara | ............. | F16F 15/13484 464/68.8 |
| 8,641,537 B2 * | 2/2014 | Uehara | ............. | F16F 15/13469 464/68.92 |

(Continued)

FOREIGN PATENT DOCUMENTS

| | | | | |
|---|---|---|---|---|
| DE | 102015201962 A1 * | 9/2015 | ............ | F16F 15/134 |
| JP | 2001304341 A * | 10/2001 | ............ | F16F 15/134 |

(Continued)

*Primary Examiner* — Josh Skroupa
(74) *Attorney, Agent, or Firm* — United IP Counselors, LLC

(57) ABSTRACT

A damper device includes a first rotor, a second rotor, and an elastic coupling part elastically coupling the first and second rotors in a rotational direction. The elastic coupling part includes first and second elastic members that are each initially disposed in a compressed state in a neutral condition without relative rotation between the first rotor and the second rotor. The first elastic member is transitioned from the compressed state to a free state and then further compressed when torsion of the first rotor with respect to the second rotor is caused from the neutral condition to a first side in the rotational direction. The second elastic member is transitioned from the compressed state to the free state and then further compressed when the torsion of the first rotor with respect to the second rotor is caused from the neutral condition to a second side in the rotational direction.

7 Claims, 6 Drawing Sheets

(56) References Cited

U.S. PATENT DOCUMENTS

| | | | |
|---|---|---|---|
| 10,302,170 B2 * | 5/2019 | Ito | F16F 15/12366 |
| 11,674,553 B2 * | 6/2023 | Bagard | F16F 15/12366 |
| | | | 464/68.1 |

FOREIGN PATENT DOCUMENTS

| | | | | |
|---|---|---|---|---|
| JP | 2005106143 A * | 4/2005 | | F16F 15/123 |
| JP | 2011-226572 A | 11/2011 | | |
| WO | WO-2006050687 A1 * | 5/2006 | | F16F 15/12353 |

* cited by examiner

DAMPER DEVICE

CROSS-REFERENCE TO RELATED APPLICATIONS

This application claims priority to Japanese Patent Application No. 2020-134863, filed Aug. 7, 2020. The entire contents of that application are incorporated by reference herein in their entirety.

TECHNICAL FIELD

The present invention relates to a damper device.

BACKGROUND ART

A type of hybrid vehicle including an engine and an electric motor, for instance, uses such a damper device having a torque limiter function as described in Japan Laid-open Patent Application Publication No. 2011-226572 in order to prevent transmission of an excessive torque from an output side to an engine side in engine start and so forth.

The damper device described in Japan Laid-open Patent Application Publication No. 2011-226572 is provided with a damper part, including a pair of plates and a plurality of torsion springs, and a torque limiter disposed on an outer peripheral side of the damper part. The damper part and the torque limiter are coupled by rivets. Besides, a plate composing part of the torque limiter is fixed to a flywheel by bolts.

Here, a torque, transmitted between the damper part and the flywheel, is limited by the torque limiter, whereby transmission of an excessive torque is prevented between the both.

The hybrid vehicle has chances of warming up the engine by driving the motor. In this case, the damper device, provided between the motor and the engine, is actuated over both positive-side and negative-side torsional actuation ranges by fluctuations in rotation of the engine. Accordingly, in the damper device, relative rotation between an input-side rotor and an output-side rotor alternatively varies in direction. Hence, power is transmitted and received between members composing these rotors, and at this time, collision sound is supposed to be produced. Incidentally, when a gear train is provided for changing the speed of motor rotation, sound is produced in gear pairs composing the gear train due to a similar reason to the above.

BRIEF SUMMARY

It is an object of the present invention to inhibit sound produced when a damper device is actuated over both positive-side and negative-side torsional ranges.

(1) A damper device according to the present invention includes a first rotor rotated about a rotational axis, a second rotor rotated about the rotational axis, and an elastic coupling part. The second rotor is disposed to be rotatable relative to the first rotor. The elastic coupling part elastically couples the first rotor and the second rotor in a rotational direction and includes a first elastic member and a second elastic member that are each initially disposed in a compressed state in a neutral condition without torsion caused by relative rotation between the first rotor and the second rotor.

The first elastic member transitions from the compressed state to a free state and is then further compressed when the torsion of the first rotor with respect to the second rotor is caused from the neutral condition to a first side in the rotational direction. On the other hand, the second elastic member transitions from the compressed state to a free state and is then further compressed when the torsion of the first rotor with respect to the second rotor is caused from the neutral condition to a second side in the rotational direction.

It should be noted that the term "free state" herein refers to a state of each elastic member that has a free length without being compressed or extended.

In the present damper device, in the neutral condition, the first and second rotors receive both a torsional torque acting to the first side in the rotational direction and a torsional torque acting to the second side in the rotational direction from the first and second elastic members each disposed in the compressed state. Therefore, even in fluctuations in input torque less than or equal to the torsional torque generated by the compressed elastic member, an angle of torsion (relative rotation) between the first and second rotors can be made as small as possible. Because of this, it is possible to inhibit collision sound produced between respective members due to torque fluctuations in a predetermined torsion angular range.

(2) Preferably, the first elastic member is further compressed from the compressed state when the torsion of the first rotor with respect to the second rotor is caused from the neutral condition to the second side in the rotational direction. On the other hand, the second elastic member is further compressed from the compressed state when the torsion of the first rotor with respect to the second rotor is caused from the neutral condition to the first side in the rotational direction.

(3) Preferably, the first and second elastic members are equal in stiffness.

(4) Preferably, the first rotor includes a first support portion and a second support portion. Besides, the second rotor includes a first accommodation portion and a second accommodation portion. The first accommodation portion is disposed to overlap in part the first support portion and be offset from the first support portion to the first side in the rotational direction as seen in an axial direction. The second accommodation portion is disposed to overlap in part the second support portion and be offset from the second support portion to the second side in the rotational direction as seen in the axial direction. Furthermore, in this case, the first elastic member is disposed in the first support portion and the first accommodation portion. On the other hand, the second elastic member is disposed in the second support portion and the second accommodation portion and is actuated in parallel with the first elastic member.

(5) Preferably, the first and second support portions each include a first support surface on one end thereof located on the first side in the rotational direction and each include a second support surface on the other end thereof located on the second side in the rotational direction. Besides, the first and second accommodation portions each include a first accommodation surface on one end thereof located on the first side in the rotational direction and each include a second accommodation surface on the other end thereof located on the second side in the rotational direction. Furthermore, in this case, the first elastic member is disposed in the compressed state between the first support surface and the second accommodation surface. On the other hand, the second elastic member is disposed in the compressed state between the first accommodation surface and the second support surface.

(6) Preferably, the elastic coupling part further includes a third elastic member and a fourth elastic member. The third and fourth elastic members are each initially disposed in a compressed state in the neutral condition. Besides, the third elastic member transitions from the compressed state to a free state and is then further compressed when the torsion of the first rotor with respect to the second rotor is caused from the neutral condition to the first side in the rotational direction. The fourth elastic member transitions from the compressed state to a free state and is then further compressed when the torsion of the first rotor with respect to the second rotor is caused from the neutral condition to the second side in the rotational direction.

(7) Preferably, the first rotor further includes a third support portion and a fourth support portion. The third support portion is opposed to the first support portion with respect to the rotational axis. The fourth support portion is opposed to the second support portion with respect to the rotational axis. Besides, preferably, the second rotor further includes a third accommodation portion and a fourth accommodation portion. The third accommodation portion is opposed to the first accommodation portion with respect to the rotational axis. The fourth accommodation portion is opposed to the second accommodation portion with respect to the rotational axis. Moreover, the third accommodation portion is disposed to overlap in part the third support portion and be offset from the third support portion to the first side in the rotational direction as seen in the axial direction. The fourth accommodation portion is disposed to overlap in part the fourth support portion and be offset from the fourth support portion to the second side in the rotational direction as seen in the axial direction.

Furthermore in this case, the third elastic member is disposed in the third support portion and the third accommodation portion. On the other hand, the fourth elastic member is disposed in the fourth support portion and the fourth accommodation portion and is actuated in parallel with the third elastic member.

Overall, according to the present invention described above, it is possible to inhibit sound produced when the damper device is actuated over both positive-side and negative-side torsional ranges.

DETAILED DESCRIPTION

[Entire Configuration]

Figure 1:
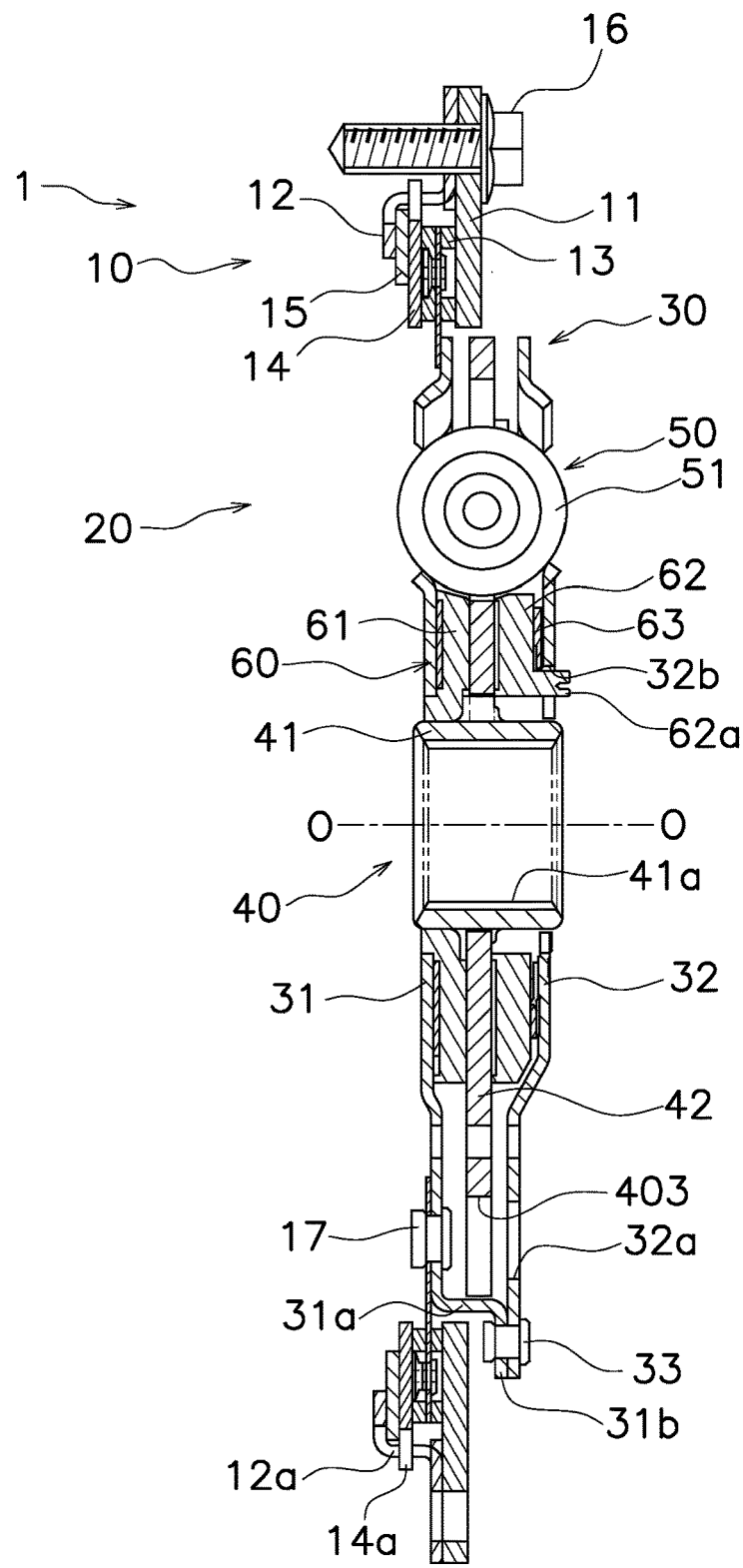
FIG. 1 is a cross-sectional view of a damper device according to a preferred embodiment of the present invention.
Figure 2:
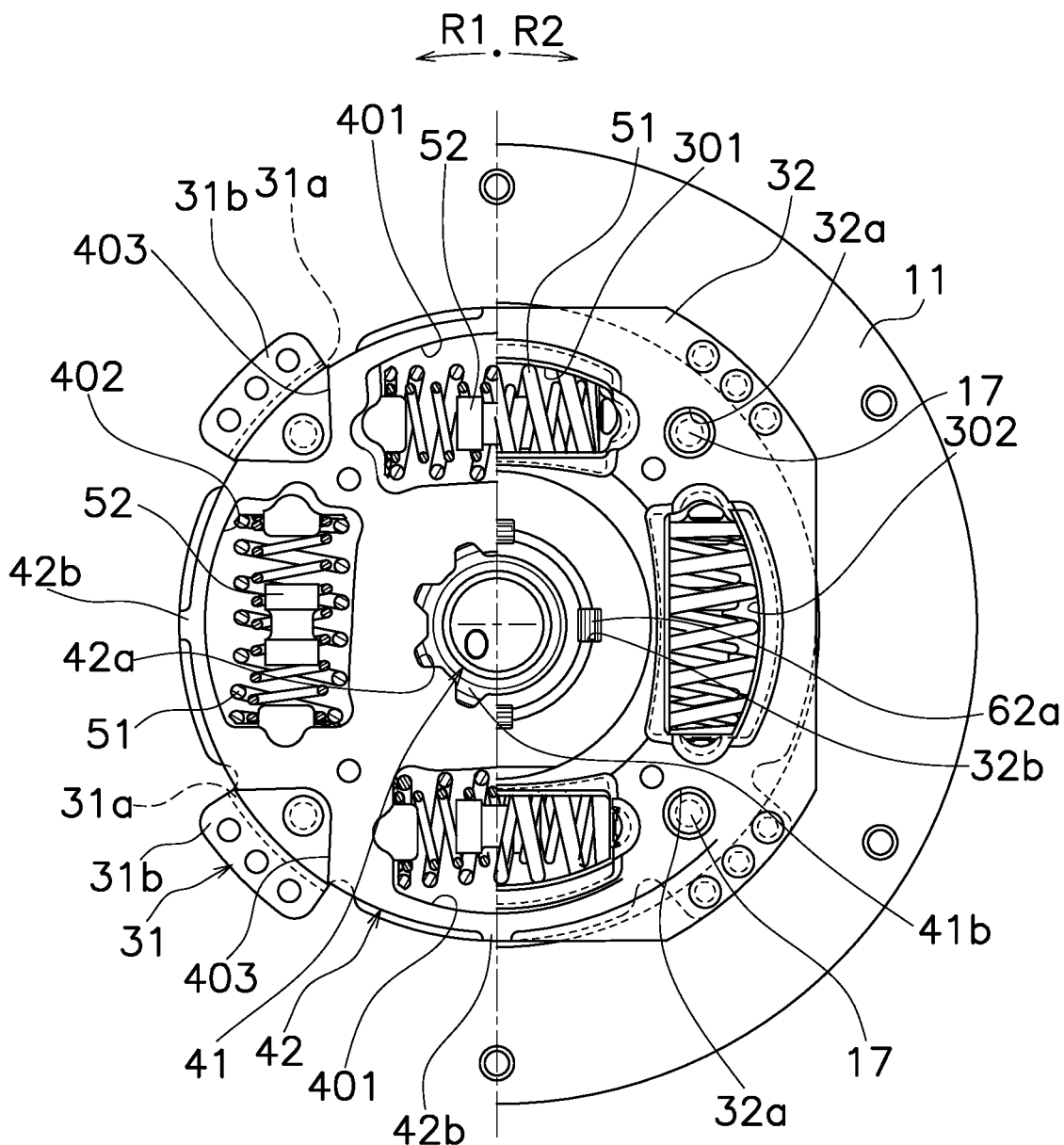
FIG. 2 is a front view of the damper device shown in FIG. 1.

FIG. 1 is a cross-sectional view of a torque limiter embedded damper device 1 (hereinafter simply referred to as "damper device 1") according to a preferred embodiment of the present invention. On the other hand, FIG. 2 is a front view of the damper device 1, from part of which some constituent members are detached. In FIG. 1, an engine (not shown in the drawing) is disposed on the left side of the damper device 1, whereas a drive unit (not shown in the drawing), including an electric motor, a transmission, and so forth, is disposed on the right side of the damper device 1.

It should be noted that in the following explanation, the term "axial direction" refers to an extending direction of a rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O. Likewise, the radial direction is not required to be perfectly matched with a diameter direction of the imaginary circle about the rotational axis O.

The damper device 1 is a device provided between a flywheel (not shown in the drawings) and an input shaft of the drive unit in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits a torque transmitted between the flywheel and the damper unit 20. The torque limiter unit 10 includes a cover plate 11, a support plate 12, a friction disc 13, a pressure plate 14, and a cone spring 15.

The cover plate 11 and the support plate 12 are disposed at a predetermined interval in the axial direction and are fixed at the outer peripheral parts thereof to the flywheel by a plurality of bolts 16.

The friction disc 13, the pressure plate 14, and the cone spring 15 are disposed axially between the cover plate 11 and the support plate 12.

The friction disc 13 includes a core plate and a pair of friction members fixed to both lateral surfaces of the core plate. The friction disc 13 is herein fixed at the inner peripheral part thereof to the damper unit 20 by a plurality of rivets 17. The pressure plate 14 and the cone spring 15 are disposed between the friction disc 13 and the support plate 12.

The pressure plate 14 has an annular shape and is disposed on the support plate 12 side of the friction disc 13. It should be noted that the pressure plate 14 is provided with a plurality of pawls 14a in the outer peripheral part thereof, and the pawls 14a are engaged with a plurality of engaging holes 12a provided in the support plate 12.

The cone spring 15 is disposed between the pressure plate 14 and the support plate 12. The cone spring 15 presses the friction disc 13 against the cover plate 11 through the pressure plate 14.

[Damper Unit 20]

The damper unit 20 includes an input-side plate 30 (exemplary first rotor), a hub flange 40 (exemplary second rotor), an elastic coupling part 50, and a hysteresis generating mechanism 60.

<Input-Side Plate 30>

The input-side plate 30 includes a first plate 31 and a second plate 32. The first and second plates 31 and 32, each of which is made in shape of a disc including a hole in the center part thereof, are disposed at an interval in the axial direction. The first plate 31 includes four stopper portions 31a and four fixation portions 31b in the outer peripheral part thereof. Besides, the first and second plates 31 and 32 each include a pair of first support portions 301 and a pair of second support portions 302. The first and second support portions 301 and 302 provided in the first plate 31 are identical in position to those provided in the second plate 32. Furthermore, the first plate 31 is provided with assembling holes 32a in corresponding positions to the rivets 17.

The stopper portions 31a are formed by bending the outer peripheral part of the first plate 31 toward the second plate 32 and extend in the axial direction. The fixation portions 31b are formed by bending the distal ends of the stopper portions 31a radially outward. The fixation portions 31b are fixed to the outer peripheral end of the second plate 32 by a plurality of rivets 33. Because of this, the first and second plates 31 and 32 are non-rotatable relative to each other and are axially immovable from each other.

The pair of first support portions 301 is opposed to each other with respect to the rotational axis O. On the other hand, the pair of second support portions 302 is opposed to each other with respect to the rotational axis O, while being displaced from the pair of first support portions 301 at an angular interval of 90 degrees. Each support portion 301, 302 includes a hole axially penetrating therethrough and an edge part formed by cutting and raising the inner and outer peripheral edges of the hole.

Figure 3:
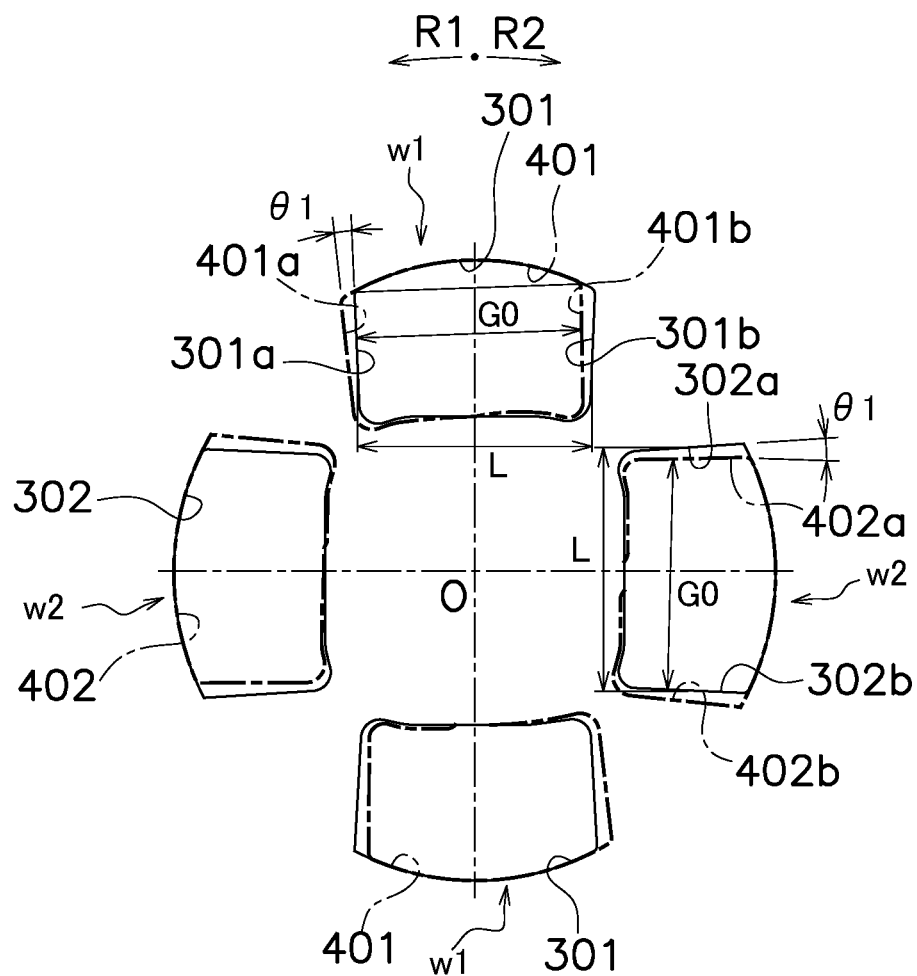
FIG. 3 is a schematic diagram showing a relation between an input-side plate and a hub flange.

As schematically shown in FIG. 3, each support portion 301, 302 includes an R1 support surface 301a, 302a on one end thereof located on a first side in the rotational direction (hereinafter simply referred to as "R1 side") and includes an R2 support surface 301b, 302b on the other end thereof located on a second side in the rotation direction (hereinafter simply referred to as "R2 side"). In each support portion 301, 302, the width of the hole (distance between the R1 and R2 support surfaces) is L. Besides, each support surface 301a, 301b, 302a, 302b enables each of coil springs 51 (to be described) to make contact therewith at one of the end surfaces thereof.

It should be noted that in FIG. 3, the first and second support portions 301 and 302 are depicted with solid line, whereas first and second accommodation portions 401 and 402 (to be described) of the hub flange 40 are depicted with dashed-dotted line. It should be also noted that FIG. 3 is a schematic diagram and is therefore different from FIG. 2 in which constituent members are depicted in actual specific shape.

<Hub Flange 40>

As shown in FIGS. 1 and 2, the hub flange 40 includes a hub 41 and a flange 42. The hub flange 40 is rotatable relative to the input-side plate 30 in a predetermined angular range. The hub 41 has a tubular shape and is provided with a spline hole 41a in the center part thereof. Besides, the hub 41 penetrates both holes provided in the center parts of the first and second plates 31 and 32. The flange 42 is made in shape of a disc including a hole in the center part thereof and is disposed radially outside the hub 41. The flange 42 is disposed axially between the first and second plates 31 and 32.

As shown in FIG. 2, the hub 41 is provided with a plurality of external teeth 41b on the outer peripheral surface thereof, whereas the flange 42 is provided with a plurality of internal teeth 42a on the inner peripheral surface thereof so as to be meshed with the external teeth 41b of the hub 41. Therefore, the hub 41 and the flange 42 are unitarily rotated with each other. It should be noted that in the present preferred embodiment, the hub 41 and the flange 42 are provided as separate members, but alternatively, can be provided as a single member.

The flange 42 includes four stopper protrusions 42b, a pair of first accommodation portions 401, a pair of second accommodation portions 402, and four cutouts 403.

The four stopper protrusions 42b are shaped to protrude radially outward from the outer peripheral surface of the flange 42. Each stopper protrusion 42b is provided in a position located radially outside the circumferential middle of each accommodation portion 401, 402. Now, when the input-side plate 30 and the hub flange 40 are rotated relative to each other, the stopper protrusions 42b make contact with the stopper portions 31a of the first plate 31. Accordingly, relative rotation is prevented between the input-side plate 30 and the hub flange 40.

As shown in FIG. 3, the pair of first accommodation portions 401 is disposed in corresponding positions to the pair of first support portions 301. On the other hand, the pair of second accommodation portions 402 is disposed in corresponding positions to the pair of second support portions 302. When explained in more detail, in a neutral condition (at a torsion angle of 0 degree) that an angle of relative rotation between the input-side plate 30 and the hub flange 40 is 0 degree, and in other words, torsion is not caused between the input-side plate 30 and the hub flange 40, the pair of first accommodation portions 401 is disposed to overlap in part the pair of first support portions 301 and be offset (or displaced) from the pair of first support portions 301 to the R1 side by an angle $\theta 1$ as seen in the axial direction. On the other hand, the pair of second accommodation portions 402 is disposed to overlap in part the pair of second support portions 302 and be offset (or displaced) from the pair of second support portions 302 to the R2 side by the angle $\theta 1$ as seen in the axial direction.

Each accommodation portion 401, 402 is an approximately rectangular hole that the outer peripheral part thereof is made in shape of a circular arc. As shown in FIG. 3, each accommodation portion 401, 402 includes an R1 accommodation surface 401a, 402a on one end thereof located on the R1 side and includes an R2 accommodation surface 401b, 402b on the other end thereof located on the R2 side. In each accommodation portion 401, 402, the width of the hole (distance between the R1 accommodation surface 401a, 402a and the R2 accommodation surface 401b, 402b) is set to be L in similar manner to the width of the hole in each support portion 301, 302. Besides, each accommodation surface 401a, 401b, 402a, 402b enables each of the coil springs 51 (to be described) to make contact therewith at corresponding one of the end surfaces thereof.

The four cutouts 403 are each provided circumferentially between adjacent two accommodation portions 401 and 402 and are recessed radially inward from the outer peripheral surface of the flange 42 at a predetermined depth. The cutouts 403 are provided in corresponding positions to the rivets 17 by which the first plate 31 and the friction disc 13 of the torque limiter unit 10 are coupled to each other. Therefore, the torque limiter unit 10 and the damper unit 20, assembled in different steps, can be fixed to each other by the rivets 17 with use of the assembling holes 32a of the second plate 32 and the cutouts 403 of the flange 42.

<Elastic Coupling Part 50>

The elastic coupling part 50 includes four coil springs 51 (exemplary first and second elastic members) and four resin members 52. Each coil spring 51 is composed of an outer spring and an inner spring. The four coil springs 51 are accommodated in the accommodation portions 401 and 402 of the flange 42, respectively, while being supported in both radial and axial directions by the support portions 301 and 302 of the input-side plate 30, respectively. The coil springs 51 are actuated in parallel.

Incidentally, the four coil springs 51 are equal in free length (Sf). The free length Sf of each coil spring 51 is equal to the width L of each of each support portion 301, 302 and each accommodation portion 401, 402. Besides, the four coil springs 51 are equal in stiffness. Likewise, the four resin members 52 are equal in stiffness.

<Accommodation States of Coil Springs 51>

Now, a layout of the support portions 301 and 302 and the accommodation portions 401 and 402 and an accommodation state of each coil spring 51, which are made in the neutral condition, will be hereinafter explained in detail. It should be noted that in the following explanation, on an as-needed basis, a set of the first support portion 301 and the first accommodation portion 401 will be referred to as "first window set w1", whereas a set of the second support portion 302 and the second accommodation portion 402 will be referred to as "second window set w2".

As described above, in the neutral condition as shown in FIG. 3, each of the pair of first accommodation portions 401 is offset from corresponding one of the pair of first support portions 301 to the R1 side by the angle θ1. On the other hand, each of the pair of second accommodation portions 402 is offset from corresponding one of the pair of the second support portions 302 to the R2 side by the angle θ1. Besides, each coil spring 51 is attached in a compressed state to an opening (axially penetrating hole) formed by axial overlap between each support portion 301, 302 and each corresponding accommodation portion 401, 402.

Specifically, in the neutral condition as shown in FIG. 3, in each of the pair of first window sets w1, the coil spring 51 makes contact at the R1-side end surface thereof with the R1 support surface 301a, while making contact at the R2-side end surface thereof with the R2 accommodation surface 401b. On the other hand, in each of the pair of second window sets w2, the coil spring 51 makes contact at the R1-side end surface thereof with the R1 accommodation surface 402a, while making contact at the R2-side end surface thereof with the R2 support surface 302b.

<Hysteresis Generating Mechanism 60>

As shown in FIG. 1, the hysteresis generating mechanism 60 includes a first bushing 61, a second bushing 62, and a cone spring 63. The first bushing 61 is disposed axially between the first plate 31 and the flange 42. The first bushing 61 is provided with a friction member fixed to a surface thereof making frictional contact with the first plate 31. The second bushing 62 is disposed axially between the second plate 32 and the flange 42. The second bushing 62 is provided with a friction member fixed to one surface thereof making frictional contact with the flange 42. Besides, the second bushing 62 is provided with a plurality of engaging protrusions 62a axially protruding from the other surface thereof located on the second plate 32 side. The engaging protrusions 62a are engaged with a plurality of engaging holes 32b of the second plate 32, respectively. The cone spring 63 is disposed axially between the second bushing 62 and the second plate 32, while being compressed therebetween.

With the configuration described above, the first bushing 61 is pressed against the first plate 31, while the second bushing 62 is pressed against the flange 42. Therefore, when the input-side plate 30 and the hub flange 40 are rotated relative to each other, a hysteresis torque is generated between the pressing member 61, 62 and the pressed member 31, 42.

[Actions]

It should be noted that the hysteresis torque is not considered in the following explanation of actions and torsional characteristics shown in FIGS. 6A, 6B and 6C.

<First Window Sets w1>

In the neutral condition without relative rotation between the input-side plate 30 and the hub flange 40, as shown in FIG. 3, the coil spring 51 in each first window set w1 is disposed in a compressed state between the R1 support surface 301a and the R2 accommodation surface 401b. The interval between the R1 support surface 301a and the R2 accommodation surface 401b is G0 and is narrower than the width L (equal to the free length Sf of the coil spring 51) in each of each support portion 301, 302 and each accommodation portion 401, 402. Therefore, as shown in FIG. 6B, in each first window set w1, a torsional torque −t is generated by the compressed coil spring 51.

Figure 4:
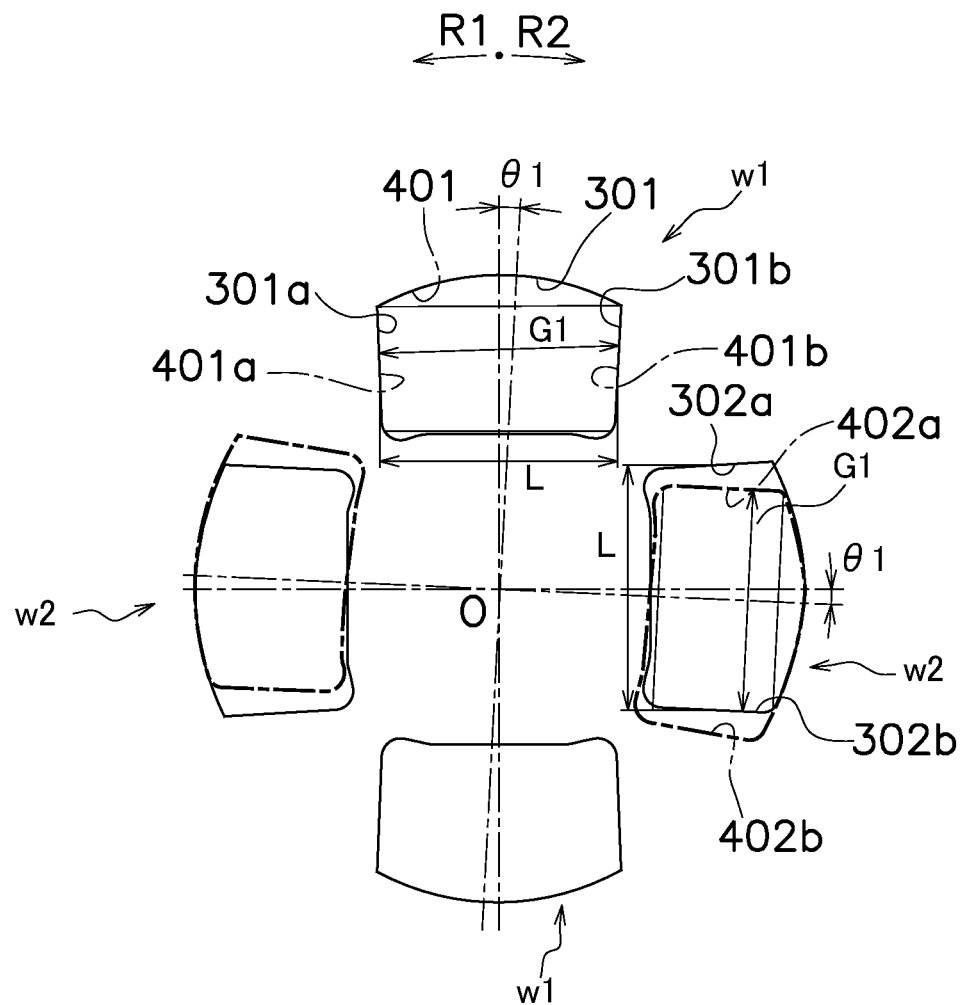
FIG. 4 is a schematic diagram of the relation where the input-side plate and the hub flange are rotated relative to each other by an angle θ1.

FIG. 4 shows a condition that a torque inputted to the damper unit 20 fluctuates and torsion of the hub flange 40 with respect to the input-side plate 30 is caused from the neutral condition to the R2 side by the angle θ1. Here, in each first window set w1, the interval between the R1 support surface 301a making contact with the R1-side end surface of the coil spring 51 and the R2 accommodation surface 401b making contact with the R2-side end surface of the coil spring 51 is G1 and becomes wider than the interval G0. The interval G1 is equal in magnitude to the free length Sf of the coil spring 51. In other words, when the torsion angle between the input-side plate 30 and the hub flange 40 reaches +θ1, the coil spring 51 in each first window set w1 becomes a free-length-Sf state, whereby the torsional torque becomes "0" as shown in FIG. 6B.

Figure 5:
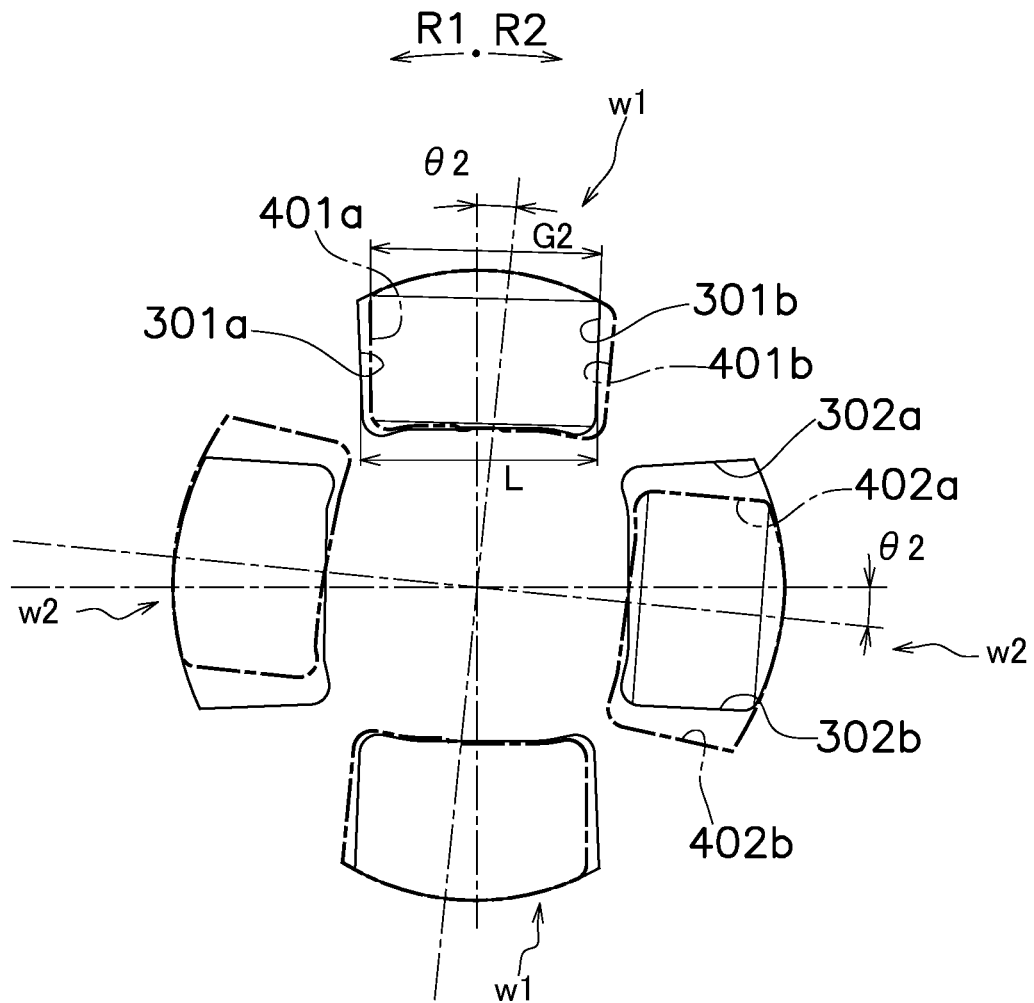
FIG. 5 is a schematic diagram of the relation where the input-side plate and the hub flange are rotated relative to each other by an angle θ2.

Moreover, when torsion of the hub flange 40 with respect to the input-side plate 30 is caused at a greater torsion angle than θ1, as shown in FIG. 5 (in which a condition made at a torsion angle θ2 (>θ1) is shown), the coil spring 51 in each first window set w1 makes contact at the R1-side end surface thereof with the R1 accommodation surface 401a, while making contact at the R2-side end surface thereof with the R2 support surface 301b. Here, the interval between the R1 accommodation surface 401a and the R2 support surface 301b is G2 and becomes narrower than the free length Sf of the coil spring 51. In other words, when the torsion angle between the input-side plate 30 and the hub flange 40 becomes greater than θ1, the coil spring 51 is compressed from the free-length-Sf state, whereby the torsional torque gradually increases as shown in FIG. 6B.

On the other hand, when torsion of the hub flange 40 with respect to the input-side plate 30 is caused from the neutral condition to the R1 side, the coil spring 51 is constantly compressed between the R1 support surface 301a and the R2 accommodation surface 401b. In other words, in each first window set w1, the torsional torque increases to the negative side with increase in torsion angle in a negative-side torsional range as shown in FIG. 6B.

<Second Window Sets w2>

In the neutral condition, the coil spring 51 in each second window set w2 is disposed in a compressed state between the R1 accommodation surface 402a and the R2 support surface 302b. The interval between the R1 accommodation surface 402a and the R2 support surface 302b is G0 and is narrower than the width L (equal to the free length Sf of the coil spring 51) in each of each support portion 301, 302 and each accommodation portion 401, 402. Therefore, as shown in FIG. 6C, in each second window set w2, a torsional torque +t is generated by the compressed coil spring 51. When torsion of the hub flange 40 with respect to the input-side plate 30 is caused from the neutral condition to the R2 side, the coil spring 51 is constantly compressed between the R1 accommodation surface 402a and the R2 support surface 302b. In other words, in each second window set w2, the torsional torque increases with increase in torsion angle in a positive-side torsional range as shown in FIG. 6C.

On the other hand, when torsion of the hub flange 40 with respect to the input-side plate 30 is caused from the neutral condition to the R1 side by the angle θ1, the interval between the R1 accommodation surface 402a making contact with the R1-side end surface of the coil spring 51 and the R2 support surface 302b making contact with the R2-side end surface of the coil spring 51 becomes wider than the interval G0. The interval herein produced is equal in magnitude to the free length Sf of the coil spring 51. In other words, when the torsion angle between the input-side plate 30 and the hub flange 40 reaches −θ1, the torsional torque in each second window set w2 becomes "0" as shown in FIG. 6C.

Moreover, when torsion of the hub flange 40 with respect to the input-side plate 30 is caused to the R1 side at a greater torsion angle than θ1, the coil spring 51 in each second window set w2 makes contact at the R1-side end surface thereof with the R1 support surface 302a, while making contact at the R2-side end surface thereof with the R2 accommodation surface 402b. Furthermore, when the torsion angle becomes greater in absolute value than −θ1, the coil spring 51 is compressed from the free-length-Sf state, whereby the torsional torque gradually increases to the negative side as shown in FIG. 6C.

<Net Torsional Characteristic>

Figure 6A:
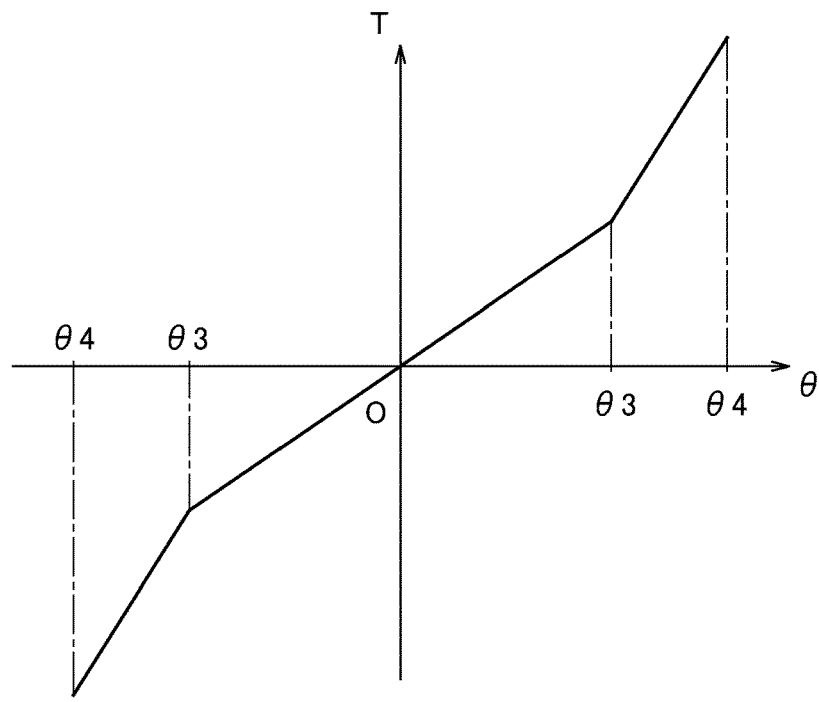
FIGS. 6A, 6B and 6C are charts showing torsional characteristics of a damper unit.
Figure 6B:
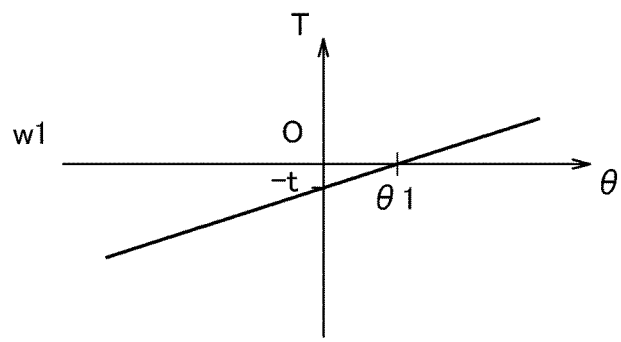
Figure 6C:
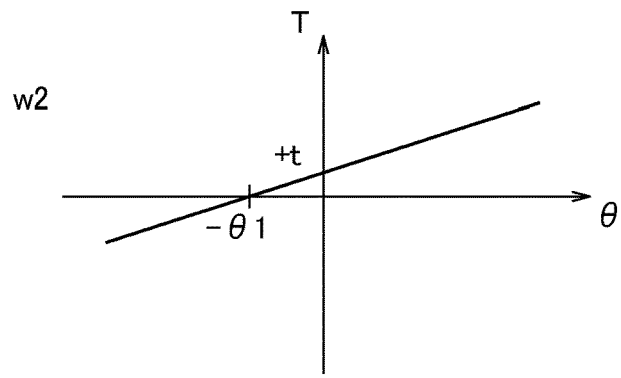

Torsional characteristics shown in FIG. 6A are net torsional characteristics obtained by adding a torsional characteristic shown in FIG. 6B and that shown in FIG. 6C and represent torsional characteristics of the entire damper unit. In other words, the torsional torque is "0" in the neutral condition and increases to both the positive side and the negative side with increase in torsion angle to both the positive side and the negative side.

Here, in the torsional characteristics of the entire damper unit, apparent torsional torque is "0" in the neutral condition. However, as described above, the positive-side torsional torque and the negative-side torsional torque act on the input-side member and the output-side member. Therefore, when torque fluctuations occur in a range of +t to −t, the torsion angle between the input-side plate 30 and the hub flange 40 falls in a range of −θ1 to +θ1, and the coil spring 51 in each first window set w1 does not make contact at the end surfaces thereof with the R1 accommodation surface 401a and the R2 support surface 301b. On the other hand, the coil spring 51 in each second window set w2 does not make contact at the end surfaces thereof with the R1 support surface 302a and the R2 accommodation surface 402b. Because of this, it is possible to inhibit collision sound produced between respective members due to torque fluctuations when torque fluctuations occur in the range of +t to −t.

On the other hand, when the torsion angle becomes greater in absolute value than ±θ1, the coil spring 51 in each first window set w1 or each second window set w2 becomes the free-length state. This configuration can further inhibit collision sound produced between respective members than a configuration that all the coil springs 51 are set in the free-length state.

It should be noted that as shown in FIG. 6A, when the torsion angle reaches ±θ3, the resin member 52 in each window set w1, w2 is compressed. Therefore, torsional characteristics of the entire damper device function as two-stage characteristics. Furthermore, when the torsion angle then reaches ±θ4, the stopper protrusions 42b of the flange 42 make contact with the stopper portions 31a of the first plate 31, whereby the input-side plate 30 and the hub flange 40 are prevented from rotating relative to each other.

Other Preferred Embodiments

The present invention is not limited to the preferred embodiment described above, and a variety of changes or modifications can be made without departing from the scope of the present invention.
 (a) A relation between the width of each of each support portion 301, 302 and each accommodation portion 401, 402 and the free length of each coil spring 51 is not limited to that in the preferred embodiment described above.
 (b) In the preferred embodiment described above, all the coil springs are set to be equal in stiffness. However, coil springs herein used can be different in stiffness from each other.
 (c) The number of accommodation portions, that of support portions, and that of coil springs are exemplary only and are not limited to those in the preferred embodiment described above.

REFERENCE SIGNS LIST

1 Damper device
30 Input-side plate (first rotor)
301 First support portion
302 Second support portion
301a, 302a R1 support surface
301b, 302b R2 support surface
40 Hub flange (second rotor)
401 First accommodation portion
402 Second accommodation portion
401a, 402a R1 accommodation surface
401b, 402b R2 accommodation surface
50 Elastic coupling part
51 Coil spring (first elastic member, second elastic member)

What is claimed is:

1. A damper device comprising:
a first rotor rotated about a rotational axis;
a second rotor rotated about the rotational axis, the second rotor disposed to be rotatable relative to the first rotor; and
an elastic coupling part configured to elastically couple the first rotor and the second rotor in a rotational direction, the elastic coupling part including a first elastic member and a second elastic member, the first and second elastic members each initially disposed in a respective initial compressed state in a neutral condition without torsion caused by relative rotation between the first rotor and the second rotor, wherein
the elastic coupling part is configured such that the first elastic member transitions from its initial compressed state to a free state and then is recompressed when the torsion of the first rotor with respect to the second rotor is caused from the neutral condition to a first side in the rotational direction, and
the elastic coupling part is configured such that the second elastic member transitions from its initial compressed state to a free state and then is recompressed when the torsion of the first rotor with respect to the second rotor is caused from the neutral condition to a second side in the rotational direction.

2. The damper device according to claim 1, wherein the elastic coupling part is configured such that the first elastic member is further compressed from its initial compressed state when the torsion of the first rotor with respect to the second rotor is caused from the neutral condition to the second side in the rotational direction, and the elastic coupling part is configured such that the second elastic member is further compressed from its initial compressed state when the torsion of the first rotor with respect to the second rotor is caused from the neutral condition to the first side in the rotational direction.

3. The damper device according to claim 1, wherein the first and second elastic members are equal in stiffness.

4. The damper device according to claim 1, wherein the elastic coupling part includes a first support portion and a second support portion in the first rotor, the elastic coupling part includes a first accommodation portion and a second accommodation portion in the second rotor, the first accommodation portion disposed to overlap in part the first support portion and be offset from the first support portion to the first side in the rotational direction in the neutral condition as seen in an axial direction, the second accommodation portion disposed to overlap in part the second support portion and be offset from the second support portion to the second side in the rotational direction in the neutral condition as seen in the axial direction, the first elastic member is disposed in the first support portion and the first accommodation portion, and the second elastic member is disposed in the second support portion and the second accommodation portion, the second elastic member actuated in parallel with the first elastic member.

5. The damper device according to claim 4, wherein the first and second support portions each include a first support surface on one end thereof located on the first side in the rotational direction, and the first and second support portions each include a second support surface on another end thereof located on the second side in the rotational direction, the first and second accommodation portions each include a first accommodation surface on one end thereof located on the first side in the rotational direction, and the first and second accommodation portions each include a second accommodation surface on another end thereof located on the second side in the rotational direction, the first elastic member is disposed in its initial compressed state between the first support surface and the second accommodation surface, and the second elastic member is disposed in its initial compressed state between the first accommodation surface and the second support surface.

6. The damper device according to claim 1, wherein the elastic coupling part further includes a third elastic member and a fourth elastic member, the third and fourth elastic members each initially disposed in a compressed state in the neutral condition, the third elastic member is configured to be transitioned from the compressed state to a free state and then be recompressed when the torsion of the first rotor with respect to the second rotor is caused from the neutral condition to the first side in the rotational direction, and the fourth elastic member is configured to be transitioned from the compressed state to a free state and then be recompressed when the torsion of the first rotor with respect to the second rotor is caused from the neutral condition to the second side in the rotational direction.

7. The damper device according to claim 6, wherein the elastic coupling part further includes a third support portion and a fourth support portion in the first rotor, the third support portion opposed to the first support portion with respect to the rotational axis, the fourth support portion opposed to the second support portion with respect to the rotational axis, the elastic coupling part further includes a third accommodation portion and a fourth accommodation portion in the second rotor, the third accommodation portion opposed to the first accommodation portion with respect to the rotational axis, the fourth accommodation portion opposed to the second accommodation portion with respect to the rotational axis, the third accommodation portion is disposed to overlap in part the third support portion and be offset from the third support portion to the first side in the rotational direction in the neutral condition as seen in the axial direction, the fourth accommodation portion is disposed to overlap in part the fourth support portion and be offset from the fourth support portion to the second side in the rotational direction in the neutral condition as seen in the axial direction, the third elastic member is disposed in the third support portion and the third accommodation portion, and the fourth elastic member is disposed in the fourth support portion and the fourth accommodation portion, the fourth elastic member actuated in parallel with the third elastic member.

* * * * *